BOBBY J. SUBLETT
GEORGE P. TOUEY
INVENTORS

United States Patent Office 3,413,982
Patented Dec. 3, 1968

3,413,982
TOBACCO SMOKE FILTER EMPLOYING ETHYL-
ENE COPOLYMER BONDING MATERIAL
Bobby J. Sublett and George P. Touey, Kingsport, Tenn.,
assignors to Eastman Kodak Company, Rochester,
N.Y., a corporation of New Jersey
Filed Aug. 4, 1965, Ser. No. 477,144
5 Claims. (Cl. 131—266)

ABSTRACT OF THE DISCLOSURE

A filter element of filamentary material containing granular material such as activated carbon bonded to the filaments by a heat-sensitive adhesive copolymer of ethylene. The adhesive copolymer masks only that portion of the carbon particle in direct contact with the filaments.

---

Figure 1:
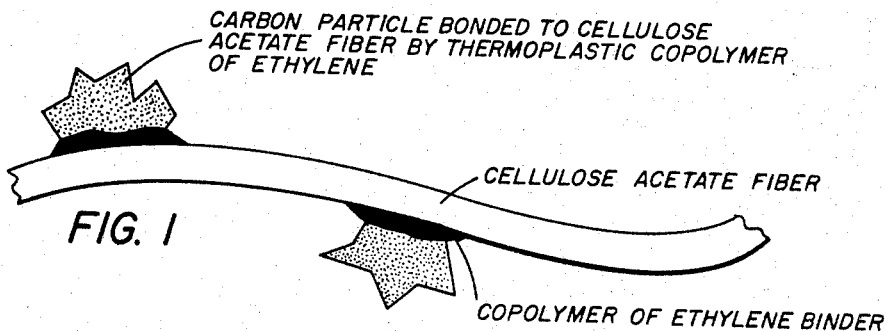

The present invention relates to tobacco smoke filters having various types of granular particles secured thereto, and more particularly to an improved fibrous filter having granular particles secured to the fibers thereof by thermoplastic copolymers. This invention further relates to novel additives of powdered ethylene copolymers, which have been found to exhibit unexpected adhesive properties when subjected to low temperatures of short duration, for bonding additives to a tobacco smoke filter, as well as to the method of producing such filters and filter tow materials.

There are numerous instances in the manufacture of various articles where it is highly desirable, if not mandatory, that certain granular like particles be securely attached in a rapid and inexpensive manner upon a given carrier surface. For example, it is often desirable in the manufacture of gas filter units to add an activated material in the form of granular particles to the surface of the filter material for aiding in the removal of certain gases and/or solids from the medium being filtered. In the manufacture of such filters the adhesive agent must not only be of a type that will securely bond the particles to the surface of the filter, but it must also neither mask or otherwise reduce the effectiveness of the active particles nor permanently modify or destroy the texture of the carrier. These stringent requirements placed upon the adhesive material to be used in a filter system are particularly manifested in the manufacture of cigarette filters made from a fiber tow that has had active granular particles attached thereto for removing certain of the undesirable components found in the vapor of cigarette smoke. Therefore, since the physical and chemical properties of any adhesive medium used in cigarette filters are so high, this invention will be described in reference to the manufacture of such cigarette filters. It is to be realized, however, that both the bonding medium and the method of this invention could be used to secure various other granular particles to a variety of surfaces.

In recent years activated carbon has become the most common, though by no means the only, granular additive placed in filters for the removal of certain undesirable components found in cigarette smoke. Heretofore various manufacturing procedures have been tried for commercially producing a tow filter material containing active carbon particles but none have proven to be totally acceptable. For example, one of the earlier approaches to the problem of manufacturing a cigarette filter containing active carbon consisted simply of spreading the filter tow and sprinkling carbon particles thereon prior to the forming of the filter rod. A filter produced in this manner has been found to be generally unacceptable, however, since the loose carbon particles carried by the filter have a tendency to "sift out." This sifting out of the carbon not only results in the loss of considerable amounts of carbon from the filter, which obviously reduces the vapor removal capability of the filter, but also causes the finished filter rod to have the displeasing appearance of being soiled or dirty. In addition this sifting out of the carbon both during the processing of the filter and after it has been formed leave much to be desired from the standpoint of clean working or smoking conditions.

In an effort to avoid the problems created by loose carbon within a cigarette filter, various procedures have been developed for bonding the carbon particles directly to the tow. The most common of these procedures involves the spraying of a bonding agent onto the open filter tow before the carbon particles are added thereto. The use of such liquid adhesives as glues or plasticizers to bond the carbon to the filter tow has been successful to a certain degree in alleviating the sifting out problem, but at the same time their use has created several new and perhaps even more bothersome problems. Besides requiring the use of special, costly spray equipment and the inclusion of additional processing steps, these liquid bonding materials tended to either mask or be absorbed by the activated carbon thus greatly reducing the effectiveness of the carbon for removing smoke vapors. The use of these tacky bonding materials also made the processing of the filter tow very difficult since fibers carrying such adhesives have a tendency to adhere to various parts of the rod making machine. Furthermore, most of these adhesives must be cured at rather high temperatures over extended periods of time which tends to further increase both the processing time and expense of such filters.

Another type of cigarette filter which consists of two component filter units and is commonly known as a "dual filter" has been tried as a means of producing an effective particle containing filter unit. These multi-layer filters generally include an outer segment of pure cellulose acetate tow followed by an inner segment formed of either carbon impregnated paper or tow fibers which have carbon particles bonded on their surfaces. As is readily apparent, the manufacture of such dual filters alleviated none of the manufacture and utility problems mentioned hereinabove since a liquid adhesive is used to bond the carbon powder to the paper or fibers. Furthermore, the use of fine carbon, as is required in making impregnated paper, restricts the amount of carbon which can be used before an excessive resistance to air flow (pressure drop) develops and the filter becomes inoperative. This further limits the maximum absorption properties that can be built into a filter of a given size. In addition, the increased number of manufacturing steps as well as the machinery required to fabricate a dual filter substantially increases the total cost of producing such filter units.

A modified version of the dual filter has recently appeared which includes a layer of loose carbon granules packed between two segments of cellulose acetate. As might be expected, filters of this type also present the usual "house cleaning" problems associated with loose carbon and require the use of special manufacturing equipment. Furthermore, no way has yet been found whereby such filters can be produced at the rapid speed and low cost demanded by industry.

Thus it can be seen that these prior known and used methods of placing or securing granular particles in a filter tow contain many inherent limitations and undesirable features which makes manufacturing a filter difficult and limits their effectiveness. Among the problems encountered in the use of such methods are: (1) the house cleaning problem; (2) the tacky packaging or handling problem; (3) the high temperature required to cure the adhesives; (4) the long curing time of the adhesives; (5) the special manufacturing equipment and numerous process steps required; (6) the absence of any practical method for mass producing certain of these filter units; and (7) the excessively high cost of manufacturing such filter units.

It has been found that the above enumerated disadvantages normally associated with the fabrication of a filter containing granular particles can be eliminated by using a blend produced in accordance with this invention. This blend is produced by mechanically mixing the granular particles to be bonded to a surface with particles of a thermoplastic copolymer until the granular particles are substantially uniformly distributed over the surface of the copolymer. The thermoplastic copolymers which have been found to be useful, and which exhibit the desired low temperature curing points, are those derived from ethylene and a comonomer of vinyl and isopropenyl esters of carboxylic acids such as, for example, acetic, propionic, butyric and isobutyric. Also copolymers of ethylene, acrylic and methacrylic acid esters derived from alcohols which contain from 1 to 8 carbon atoms have been found to be very useful. These copolymers of ethylene may contain from 1 to 50 percent comonomer and have an inherent viscosity of 0.5 to 2.5 with an inherent viscosity of 1.0 to 1.5 being preferred. The size of the copolymer particles to be used in the blend can be anywhere within a 10 to 300 mesh range, but preferably is 50 to 200 mesh in size.

The activated carbon used in the blend can be derived from wood, petroleum, nut shell (such as cocoanut or pecan shell), coal, blood, bone or any other convenient source. For purposes of use in this invention, the carbon should be of a particle size which will pass through a screen in the range between 8 and 100 mesh. However, it is preferred for use in this invention that the carbon particle size fall between 20 and 60 mesh.

Another object of this invention is to disclose a new and improved filter which contains active particles bonded thereto for removing materials or gases from the medium being filtered.

Yet another object of this invention is to disclose a new and improved filamentary type filter in which activated particles are bonded to the surface of the individual filaments of the filter.

Yet still another object of this invention is to disclose a bonding substance for attaching granular particles to the filaments of a cigarette filter.

A further object of this invention is to disclose a cigarette filter consisting of activated carbon bonded to cellulose acetate tow by a copolymer of ethylene.

Figure 2:
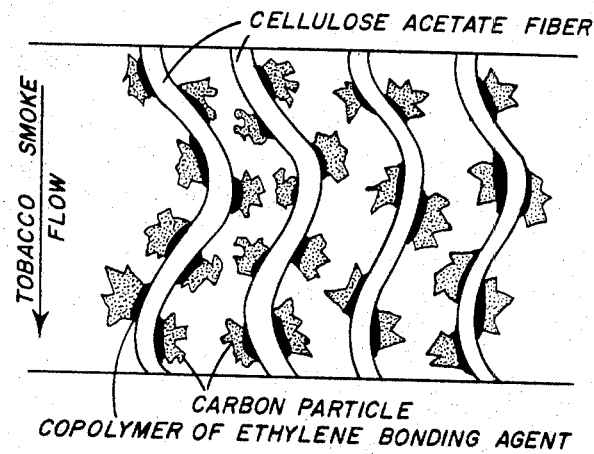
Figure 3:
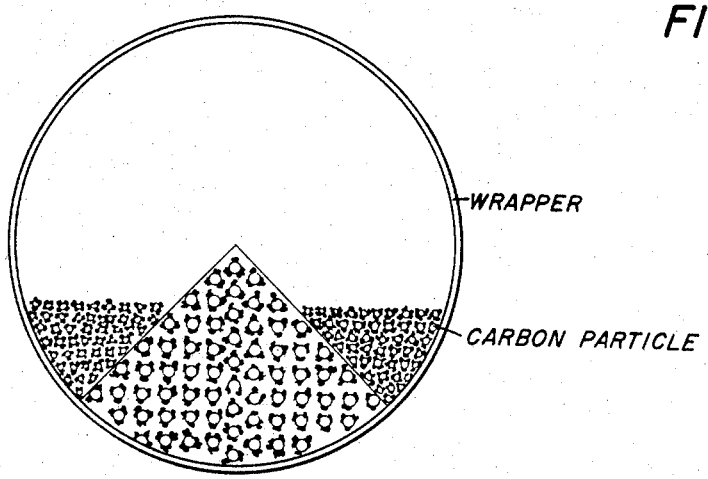

These and other objects and advantages of this invention will be more apparent upon reference to the following specification, claims and appended drawings wherein:

FIGURE 1 is a pictural illustration on a greatly enlarged scale of a single filament which has attached to its outer surface a plurality of granular particles by a bonding agent of the present invention;

FIGURE 2 is a schematic side-elevation view on an enlarged scale of a plurality of tow filaments having activated carbon particles attached on their outer surface by a bonding agent of the present invention; and FIGURE 3 is a cross-sectional view on an enlarged scale of a filter rod, in which a segment has been depicted on a further enlarged scale, containing a plurality of filaments having granular particles attached on their surfaces in the manner and by the use of a binder taught by the present invention.

With continued reference to the accompanying drawing, and with initial attention directed to FIGURE 1, it is seen that the activated carbon particles are directly bonded to the outer surface of the cellulose acetate fiber by the ethylene copolymer binder. As will be apparent, the only portion of the carbon particle which is masked by the ethylene copolymer binder is that area which is in direct contact with the fiber. Thus the major part of the surface area of the carbon particle is available to react or absorb certain of the gases which contacts its surface. The blend of carbon and ethylene copolymer binder that is used to obtain this desired adhesive action is obtained by mechanically mixing from 5 to 50 percent by weight of the copolymer with 50 to 95 percent by weight of the carbon. For best results, however, the blend should contain from 10 to 25 percent by weight of the ethylene copolymer with the remainder being the granular additive and the copolymer should have an inherent viscosity of from 1.0 to 1.5.

To form a filter rod of the general type illustrated in FIGURES 2 and 3 the mixture of dry activated carbon and ethylene copolymer particles are added by any suitable method to a bloomed or opened cellulose acetate tow at a suitable point in the manufacturing process. The filter tow is then heated to between 50 and 150° C. to soften the ethylene copolymer particles and make them adhesive after which the tow is wrapped with a paper tape to form the filter rod. If desirable, instead of heating the tow the filter rods can be heated after it has been formed or wrapped in order to soften the ethylene copolymer particles. For example, the formed filter rods can be placed in a suitable heating device and heated from 50 to 150° C. for from 1 to 30 minutes. After this heat treatment in which the carbon is bonded to the cellulose acetate fibers by the ethylene copolymer binder, the rods are cut to the desired lengths for use as cigarette filters.

A further understanding of the invention will be had from a consideration of the following examples which are set forth to illustrate certain preferred embodiments.

EXAMPLE 1

Approximately eleven hundred twenty-five milligrams of 12 x 30 mesh coconut carbon granules were thoroughly mixed with 281 mg. of finely divided ethylene ethyl acrylate copolymer (12% ethyl acrylate comonomer) having an inherent viscosity of 1.2. The mixture was then shaken onto a 150 mm. length of 5 denier/filament (D/F) crimped cellulose acetate tow which had 6,000 filaments and was spread out to a width of 15 inches. The tow was then heated to 100° C. for 5 minutes after which it was wrapped with a paper tape to form a filter rod with a circumference equal to that of a standard domestic cigarette (25 mm.). The rod was allowed to stand until it became firm after which it was cut into 10 mm. segments which contained approximately 75 mg. of carbon and 19 mg. of the thermoplastic polymer.

The 10 mm. filter rods were attached to king size cigarettes by means of a cellophane tape. The cigarettes were then smoked with an automatic smoking device and the vapor which passed through the filters was collected and analyzed by gas chromatography. The amounts of several components of the collected gas are listed in Table 1. For purposes of comparison the amounts of the same components found in unfiltered smoke from the same type of cigarettes are also listed in Table 1.

Several of the filters were opened and examined. It was observed that the carbon particles were tightly bonded to the cellulose acetate fibers in substantially the manner illustrated in FIGURES 1 through 3. No coating or masking of the particles was noted. Also none of the particles sifted out of the filters when they were tapped on a hard surface.

TABLE 1

| Component | μg. Found in unfiltered smoke from one cigarette | μg. Found in filtered smoke from one cigarette |
| --- | --- | --- |
| Acetaldehyde | 800 | 240 |
| Propionaldehyde | 40 | 12 |
| Acrolein | 85 | 21 |
| Methanol | 120 | 36 |
| Methyl ethyl ketone | 75 | 22 |
| Isoprene | 600 | 180 |

EXAMPLE 2

Approximately sixteen hundred fifty milligrams of 20 x 50 mesh petroleum carbon granules were thoroughly mixed with 550 mg. of powdered ethylene vinyl acetate copolymer of the type manufactured by DuPont and sold under the trade name "Elvax." The mixture was then dusted onto a 150 mm. length of crimped cellulose acetate filter tow (5 D/F–3,700 filaments) which had been opened to a width of 15 inches. The tow was bundled and wrapped with a paper tape to form a filter rod by a conventional method after which the rod was heated at 55° C. for 8 minutes and then cooled to room temeprature. The filter rod after it had become firm was cut into 10 mm. segments, which contained approximately 110 mg. of carbon, and attached to a king size cigarette by means of a cellophane tape. The cigarette was then smoked with an automatic smoking device and the vapor which passed through the filter was collected and analyzed by gas chromatography. The amounts of several components of the collected gas are listed in Table 2 along with the amounts of the same components found in unfiltered smoke.

Again the examination of several filters made in this manner revealed that the carbon particles were securely bonded to the cellulose acetate tow with no appreciable masking being observed.

TABLE 2

| Component | μg. Found in unfiltered smoke from one cigarette | μg. Found in filtered smoke from one cigarette |
| --- | --- | --- |
| Acetaldehyde | 800 | 200 |
| Propionaldehyde | 40 | 10 |
| Acrolein | 85 | 9 |
| Methanol | 120 | 40 |
| Methyl ethyl ketone | 75 | 15 |
| Isoprene | 600 | 150 |

EXAMPLE 3

Eight hundred ten milligrams of 30 x 60 mesh carbon granules derived from wood were mixed with 145 milligrams of a finely divided copolymer of ethylene and methyl methacrylate (containing 11% methyl methacrylate) with an inherent viscosity of 1.2. The mixture was then spread onto a 150 mm. length of crimped cellulose acetate filter tow (1.6 D/F–20,000 filaments) spread to a width of 15 inches. The tow was bundled and wrapped with a paper tape to form a filter rod by a conventional method. The rod was then heated in an oven at 90° C. for 5 minutes after which it was cooled to room temperature and cut into 10 mm. segments which contained approximately 54 mg. of carbon. The carbon did not sift from the filter made in this manner and microscopic observation revealed the filaments of cellulose acetate were securely bonded to the carbon particles.

The 10 mm. segments of the filter rod were attached to a king size cigarette with a cellophane tape. The cigarette was then smoked with an automatic smoking device and the vapor which passed through the filter was collected and analyzed by gas chromatography. The amounts of several components of the collected gas are listed in Table 3 along with the amounts of the same components found in unfiltered smoke.

TABLE 3

| Component | μg. Found in unfiltered smoke from one cigarette | μg. Found in filtered smoke from one cigarette |
| --- | --- | --- |
| Acetaldehyde | 800 | 560 |
| Propionaldehyde | 40 | 20 |
| Acrolein | 85 | 42 |
| Methanol | 120 | 72 |
| Methyl ethyl ketone | 75 | 45 |
| Isoprene | 600 | 360 |

It will be apparent from the foregoing that the use of the disclosed thermoplastic copolymers with granular particles eliminates the need for special and expensive applicator equipment, and at the same time reduces to an absolute minimum the house cleaning, handling and tacky adhesive problems heretofore encountered in the manufacture of granular containing filter materials. The extremely low temperatures and short curing time required to soften the ethylene copolymers and thus make them adhesive is also of utmost importance since this permits the filter material to be produced at a faster rate with a corresponding reduction in cost. Furthermore, the copolymers securely bond the particles to the carrier without masking or otherwise reducing their chemical properties, or adversely affecting the properties of the carrier.

From the foregoing it is apparent that a blend of granular materials which includes an ethylene copolymer binder gives vastly improved results over other similar materials that have previously been proposed. Not only does the ethylene copolymer firmly bond the granulars to the carrier surface, but it also "sets" at a lower temperature and in a shorter time thus permitting faster, more economical operation of the tow forming equipment. Furthermore, no special equipment, processing, handling or house cleaning problems are involved where the blend of this invention is employed in manufacturing tobacco smoke filters.

What is claimed and desired to be secured by United States Letters Patent is:

1. A tobacco smoke filter rod, said filter rod being essentially comprised of filamentary rods of a cellulose material, said filamentary rods having had applied thereto a blend comprising granules of at least one heat sensitive copolymer of ethylene, and another granular material, said blend having been subjected to sufficient heat after having contacted said filamentary rods to cause said copolymer material to securely bond said other granular material to said filamentary rods, the only portion of each of the other granules masked by said heated copolymer, being that portion in direct contact with said filamentary rods.

2. A tobacco smoke filter rod, said filter rod being essentially comprised of longitudinally extending crimped continuous cellulose acetate filaments, said filaments having had applied thereto a blend comprising carbon particles and a powdered heat sensitive copolymer of ethylene, said blend having been subject to sufficient heat after having contacted said filaments to cause said copolymer material to securely bond said particles to said filament, the only portion of each carbon particle masked by the copolymer bonding material, being that portion in direct contact with the filaments.

3. A tobacco smoke filter tow adapted to be formed into tobacco smoke filter elements comprising a carrier material having a granular particle bonded thereto by a heat sensitive copolymer of ethylene bonding material, said copolymer bonding material masking only that portion of said granluar particle in direct contact with the carrier material.

4. A tobacco smoke filter tow according to claim 3 wherein said bonding material is derived from ethylene and a comonomer of vinyl and isopropenyl esters of carboxylic acid selected from the group comprising acetic, propionic, butyric and isobutyric.

5. A tobacco smoke filter tow according to claim 4 wherein said carrier material is continuous fibers of cellulose acetate.

References Cited

UNITED STATES PATENTS

| | | | |
|---|---|---|---|
| 2,765,515 | 10/1956 | Knudson | 131—266 X |
| 3,008,472 | 11/1961 | Touey | 131—266 |
| 3,101,723 | 8/1963 | Seligman et al. | 131—266 |
| 3,217,715 | 11/1965 | Berger et al. | 131—265 X |
| 3,281,070 | 4/1968 | Sublett et al. | 131—266 X |

FOREIGN PATENTS 757,841  9/1956  Great Britain.

SAMUEL KOREN, *Primary Examiner.*

D. J. DONOHUE, *Assistant Examiner.*